United States Patent Office 3,819,654
Patented June 25, 1974

3,819,654
UNSATURATED ETHER SUBSTITUTED XAN-
THONE CARBOXYLIC ACID COMPOUNDS
Jurg R. Pfister, Los Altos, and Ian T. Harrison and
John H. Fried, Palo Alto, Calif., assignors to Syntex
Corporation, Apartado, Panama
No Drawing. Filed Sept. 25, 1972, Ser. No. 291,617
Int. Cl. C07d 7/44
U.S. Cl. 260—335     14 Claims

ABSTRACT OF THE DISCLOSURE

Compositions containing and methods employing, as the essential ingredient(s), novel unsaturated ether substituted xanthone carboxylic acid compounds which are useful in the treatment of allergic conditions. Methods for preparing these compounds and compositions and intermediates therein are also disclosed. 7-Allyloxy-xanthone-2-carboxylic acid and 5-(propargylthio)-xanthone-2-carboxylic acid are illustrated as representative of the class.

The present invention is directed to novel unsaturated ether substituted xanthone carboxylic acid compounds and to compositions containing and methods utilizing these compounds as the essential ingredient in the treatment of conditions associated with allergic manifestations, for example, asthmatic conditions.

In a first aspect, the present invention relates to C-5, 6, and 7 unsaturated oxy and thio ether substituted xanthone carboxylic acid compounds selected from those represented by the following formulas:

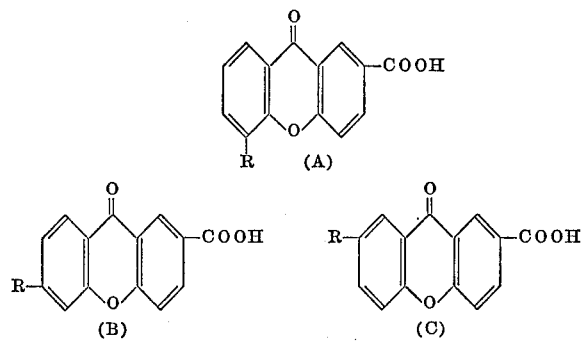

and the pharmaceutically acceptable, non-toxic esters, amides and salts thereof, wherein each R is a group selected from those of the formulas:

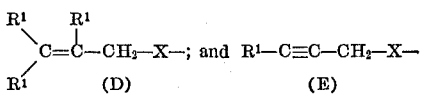

$$\underset{R^1}{\overset{R^1}{\diagdown}}C=\overset{R^1}{\underset{}{C}}-CH_2-X-; \text{ and } R^1-C\equiv C-CH_2-X-$$

(D)            (E)

in which each X is oxy(O) or thio(S) and each $R^1$ is hydrogen, methyl or ethyl.

Thus included within the scope of the present invention are the C-5 (Formula A), C-6 (Formula B), or C-7 (Formula C) substituted xanthone-2-carboxylic acid compounds and the pharmaceutically acceptable, non-toxic esters, amides, and salts thereof, wherein the substituent is selected from an alkenyloxy or alkenylthio ether group of Formula (D) above, and from an alkynyloxy or alkynylthio ether group of Formula (E) above, and the optionally methyl, ethyl ($R^1$) substituted derivatives thereof.

In a second aspect, the present invention is directed to a method useful for relieving symptoms associated with allergic manifestations, such as are brought about by antigen-antibody (allergic) reactions. In the relief of these symptoms, the method hereof serves to inhibit the effects of the allergic reaction when administered in an effective amount. While not intending to be bound by any theoretical mechanism of action, the method hereof is believed to operate by inhibiting the release and/or the action of toxic products, e.g., histamine, 5-hydroxytryptamine, slow releasing substance (SRS-A), and others, which are produced as a result of a combination of specific antibody and antigen (allergic reaction). These properties make the subject compounds particularly useful in the treatment of various allergic conditions.

This aspect of the present invention thus relates to a method useful for inhibiting the effects of the allergic reaction which comprises administering an effective amount of a compound selected from those represented above (A, B and C) and the pharmaceutically acceptable non-toxic esters, amides, and salts thereof; or a pharmaceutically acceptable non-toxic composition incorporating said acids, esters, amides or salts as an essential ingredient.

The present invention, in a third aspect, is directed to pharmaceutical compositions useful for inhibiting the effects of the allergic reaction comprising an effective amount of a compound selected from those represented above (A, B and C) and the pharmaceutically acceptable non-toxic esters, amides and salts thereof; in admixture with a pharmaceutically acceptable on-toxic carrier.

The compounds of the present invention are also smooth muscle relaxants, e.g., bronchial dilators, and are therefore useful in the treatment of conditions in which such agents may be indicated, as for instance, in the treatment of broncho-constriction. The compounds of the present invention are also vasodilators and are therefore useful in the treatment of conditions in which such agents may be indicated, as for instance, in renal and cardiac disorders.

In the practice of the method of the present invention, an effective amount of a compound of the present invention or pharmaceutical compositions thereof, as defined above, is administered via any of the usual and acceptable methods known in the art, either singly or in combination with another compound or compounds of the present invention or other pharmaceutical agents, such as antibiotics, hormonal agents, and so forth. These compounds or compositions can thus be administered topically, parenterally, by inhalation, and preferably orally, in the form of either solid, liquid, or gaseous dosages including tablets, suspensions, and aerosols, as discussed in more detail hereinafter. The administration can be conducted in single unit dosage form with continuous therapy or in single dose therapy ad libitum. In the preferred embodiments, the method of the present invention is practiced when relief of symptoms is specifically required, or, perhaps, imminent; however, the method hereof is also usefully practice as continuous or prophylactic treatment.

In view of the foregoing as well as in consideration of the degree or severity of the condition being treated, age of subject, and so forth, all of which factors being determinable by routine experimentation by one skilled in the art; the effective dosage in accordance herewith can vary over a wide range. Generally, an effective amount ranges from about 0.005 to about 100 mg. per kg. of body weight per day and preferably from about 0.01 to about 100 mg. per kg. of body weight per day. In alternate terms, an effective amount in accordance herewith generally ranges from about 0.5 to about 7000 mg. per day per subject.

Useful pharmaceutical carriers for the preparation of the compositions hereof, can be solids, liquids, or gases. Thus, the compositions can take the form of tablets, pills, capsules, powders, sustained release formulations, solutions, suspensions, elixirs, aerosols, and the like. The carriers can be selected from the various oils including those of petroleum, animal, vegetable, or synthetic origin, for example, peanut oil, soybean oil, mineral oil, sesame oil, and the like. Water, saline, aqueous dextrose, and glycols are preferred liquid carriers, particularly for injectable solutions. Suitable pharmaceutical excipients include starch, cellulose, talc, glucose, lactose, sucrose, gelatin, malt, rice, flour, chalk, silica gel, magnesium carbonate, magnesium stearate, sodium stearate, glyceryl monostearate, sodium chloride, dried skim milk, glycerol, propylene glycol, water, ethanol, and the like. Suitable pharmaceutical carriers and their formulation are described in "Remingtons Pharmaceutical Sciences" by E. W. Martin. Such compositions will, in any event, contain an effective amount of the active compound together with a suitable amount of carrier so as to prepare the proper dosage form for proper administration to the host.

The compounds of the present invention demonstrate activity as inhibitors of the effects of the allergic reaction as measured by tests indicative of such activity involving passive cutaneous anaphylaxis as substantially described, for example, by J. Goose et al., *Immunology*, 16, 749 (1969). The compounds of the present invention demonstrate bronchopulmonary activity as measured by tests indicative of such activity involving the isolated tracheal chain assay as substantially described, for example, by J.C. Castillo et al., *Journal of Pharmacology and Experimental Therapeutics*, vol. 90, 104 (1947) and the histamine aerosol bronchoconstriction assay as substantially described, for example, by O.H. Siegmund et al., *Journal of Pharmacology and Experimental Therapeutics*, vol-90, 254 (1947).

The compounds of the present invention can be prepared in accordance with the following reaction sequence:

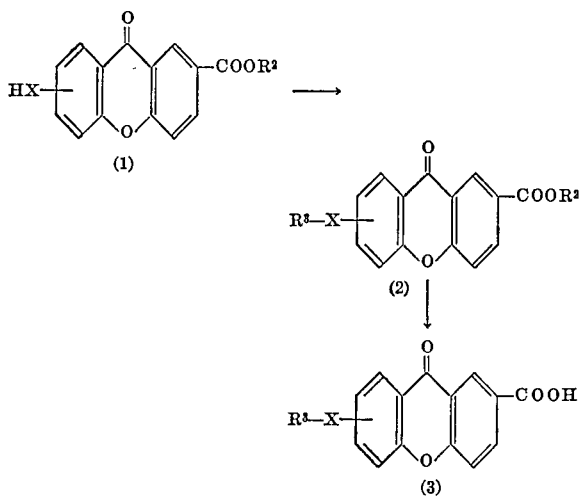

wherein X is as above defined; $R^2$ is lower alkyl, preferably methyl; $R^3$ is an alkenyl or alkynyl group as depicted and defined as part of Formulas (D) and (E) above; the HX— and $R^3$—X— groups being attached at the C–5, 6, or 7 ring positions.

With reference to the above reaction sequence, a C–5, 6, or 7 hydroxy or mercapto substituted xanthone-2-carboxylic acid ester is alkylated with an appropriate alkenyl halide or alkynyl halide in the presence of base to provide the oxyether or thioether xanthone acid ester product (2). Halide is preferably bromide, and potassium carbonate is preferably used as the base.

The reaction is preferably conducted in an inert organic reaction medium, preferably an organic amide, such as dimethyl acetamide, dimethylformamide, N-methyl pyrrolidone, tetramethylurea, and so forth, or suitable mixtures of two or more of such media. The reaction is further conducted at temperatures ranging from about 10° C. to about 80° C., preferably from about 25° C. to about 50° C., and for a period of time sufficient to complete the reaction, ranging from about 2 hours to about 12 hours.

The reaction consumes the reactants on the basis of one mole of the alkenyl or alkynyl halide reactant per mole of the xanthone acid ester substrate. However, the amounts of the reactants to be employed are not critical, some of the desired compound (2) being obtained when employing any proportions thereof. In the preferred embodiments, the reaction is conducted by reacting from about 1.5 to about 3 moles of the halide reactant and about 1.5 to 3 moles of the base per mole of xanthone acid ester. The inert organic reaction medium, if employed, is used in solvent amounts.

Thereafter, the prepared compound (2) is base hydrolyzed, if desired, to give the corresponding xanthone-2-carboxylic acid (3). The base hydrolysis conditions can be any employed conventionally in the art. Generally, the hydrolysis reaction is conducted using an alkali metal hydroxide at about 50° to about 90° C. and for a period of time sufficient to complete the reaction, ranging from about 15 minutes to about 60 minutes, preferably in the presence of inert organic reaction media, such as those normally employed in organic chemical reactions of this type, e.g., aqueous alkanol solutions. Although one mole of base is required per mole of compound (2), the amounts employed are not critical to produce the desired hydrolysis. Preferably from about 1.2 to about 1.5 moles of base are employed per mole of compound (2) and the reaction medium, if employed, is used in solvent amounts.

The starting compounds (1) are prepared as follows. An ortho or para dihydroxybenzene is condensed with a 1,3-dicarbo(lower)alkoxy)-4-halobenzene compound, e.g., 1,3-dicarbomethoxy-4-bromobenzene, in the presence of cuprous oxide optionally in organic liquid reaction medium to prepare the corresponding 1,3-dicarbo(lower) alkoxy-4-(o- or p-hydroxyphenyloxy) - benzene compound. The thus-prepared compound is base hydrolyzed to give the corresponding 1,3-dicarboxy-4-(o- or p-hydroxyphenyloxy)benzene and the latter is cyclized with phosphoryl chloride, thionyl chloride, sulfuric acid, hydrogen fluoride, or, preferably, polyphosphoric acid (PPA), to give the corresponding 5- or 7-hydroxyxanthone-2-carboxylic acid compound.

In another method, para-methylphenol is condensed with 2,4-dichlorobenzoic acid in the presence of copper powder with anhydrous potassium carbonate, optionally in organic liquid reaction medium to prepare the corresponding 2-(p-methylphenyloxy) - 4 - chlorobenzoic acid compound. This compound is oxidized with potassium permanganate in aqueous t-butanol to give the corresponding 2-(p-carboxyphenyloxy)-4-chlorobenzoic acid. The thus-prepared diacid compound is then cyclized as described above which is then treated with excess alkali metal lower alkoxide, e.g., sodium methoxide to give 6-methoxyxanthone-2-carboxylic acid. The latter compound is converted to the respective 6-hydroxy compound by treatment with hydrobromic or hydroiodic acid and acetic acid.

Similarly 5- and 7-alkoxyxanthone-2-carboxylic acid compounds (prepared as above described using o-alkoxy- or p-alkoxy-phenol in lieu of the dihydroxybenzene) are converted to the respective 5- and 7-hydroxy compounds by treatment with hydrobromic or hydroiodic acid and acetic acid. The thus-prepared C–5, 6, 7 hydroxyxanthone-2-carboxylic acid compounds are then converted to the acid lower alkyl esters (1, wherein X=O) with the desired lower alkyl iodide in the presence of lithium carbonate at room temperature or with the desired lower alkanol in the presence of a trace of sulfuric acid at reflux.

The thus-prepared hydroxy acid esters are then treated with a dialkylthiocarbamoyl chloride, such a dimethylthiocarbamoyl chloride, in the presence of base, such as an alkali metal hydride, and in organic liquid reaction media, perferably an organic amide to afford the corresponding compounds containing (alkyl)$_2$NC(S)O grouping.

These compounds are then rearranged at a temperature of from about 200° to about 250° C., preferably from about 220° to about 230° C., and for a period of time ranging from about one hour to about eight hours and in the presence of organic medium such as sulfolane, nitrobenzene, triethylene glycol and so forth, to give compounds containing a (alkyl)₂NC(O)S— grouping. The latter are then converted to the corresponding C–5, 6, or 7 mercaptoxanthone-2-carboxylic acid compounds by base hydrolysis such as described above. Acid esters thereof are prepared as described herein.

The acid esters of the xanthone-2-carboxylic acids hereof are prepared upon treatment of the acid with the desired lower alkanol in the presence of a trace of sulfuric acid at reflux. The glycerol esters are prepared by treating the acid with thionyl chloride followed by treatment with a suitably protected ethylene glycol or propylene glycol (e.g., solketal) in pyridine, and hydrolyzing the protecting group of the ester thus formed with dilute acid.

The amides of the xanthone-2-carboxylic acids hereof are prepared by treatment of the acids with thionyl chloride followed by treatment with anhydrous ammonia, alkylamine, dialkylamine, dialkylaminoalkylamine, alkoxyalkylamine, or phenethylamine.

The salts of the xanthone-2-carboxylic acids, hereof are prepared by treating the corresponding acids with pharmaceutically acceptable base. Representative salts derived from such pharmaceutically acceptable bases are sodium, potassium, lithium, ammonium, calcium, magnesium, ferrous, ferric, zinc, manganous, aluminum, manganic, the salts of trimethylamine, triethylamine, tripropylamine, β-(dimethylamino)ethanol, triethanolamine, β-(diethylamino)ethanol, arginine, lysine, histidine, N-ethylpiperidine, hydrobamine, choline, betaine, ethylenediamine, glucosamine, methyl glucamine, theobromine, purines, piperazine, piperidine, polyamine resins, caffeine, procaine, or the like. The reaction is conducted in an aqueous solution, alone or in combination with an inert, water miscible organic solvent, at a temperature of from about 0° to about 100° C., preferably at room temperature. Typical inert, water miscible organic solvents include methanol, ethanol, isopropanol, butanol, acetone, dioxane, or tetrahydrofuran. When divalent metal salts are prepared, such as the calcium salts or magnesium salts of the acids, the free acid starting material is treated with about one-third molar equivalent of pharmaceutically acceptable base. When the aluminum salts of the acids are prepared, about one-third molar equivalent of the pharmaceutically acceptable base are employed.

In the preferred embodiment of the present invention, the calcium salts and magnesium salts of the acids are prepared by treating the corresponding sodium or potassium salts of the acids with at least one molar equivalent of calcium chloride or magnesium chloride, respectively, in an aqueous solution, alone or in combination with an inert water miscible organic solvent, at a temperature of from about 20° to about 100° C.

In a preferred embodiment of the present invention, the aluminum salts of the acids are prepared by treating the acids with at least one molar equivalent of an aluminum alkoxide, such as aluminum triethoxide, aluminum tripropoxide, and the like, in a hydrocarbon solvent, such as benzene, xylene, cyclohexane, and the like, at a temperature of from about 20° to about 115° C.

By the term "pharmaceutically acceptable, non-toxic esters, amides, and salts" is respectively intended an alkyl or glycerol ester; an unsubstituted, monoalkyl, dialkyl, dialkylaminoalkyl, alkoxyalkyl, or phenethyl substituted amide and a salt as defined above.

The described 1,3-dicarbalkoxy-4-halobenzene compounds are conveniently prepared by oxidizing 1,3-dimethyl-4-halobenzene (4-halo-m-xylene) with potassium permanganate in aqueous t-butanol followed by conventional esterification.

The starting alkenyl halides and alkynyl halides are prepared by allylic bromination of the corresponding alkenes and alkynes with N-bromosuccinimide.

The following examples illustrate the method by which the present invention can be practiced.

PREPARATION 1

A mixture of 4.188 g. of 1,3-dicarbomethoxy-4-bromobenzene, 2.85 g. of p-ethoxyphenol, 1.32 g. of cuprous oxide in 20 ml. of dimethylacetamide is heated to 160° C. and maintained thereat with stirring and under a nitrogen atmosphere. After monitoring via t.l.c. indicates the reaction is substantially complete, the reaction mixture is diluted with water and extracted with diethylether:methylene chloride (3:1). The extracts are chromatographed on 150 g. of alumina and the uniform fractions combined to give 1,3-dicarbomethoxy - 4 - (p-methoxyphenyloxy)-benzene.

1,3 - Dicarbomethoxy-4-(p - methoxyphenyloxy)-benzene (3 g.) is combined with 150 ml. of 5% potassium hydroxide in methanol. The resultant mixture is refluxed for one hour after which time it is acidified, cooled, and filtered, to give 1,3-dicarbox-4-(p-methoxyphenyl)-benzene.

Two grams of 1,3-dicarboxy-4-(p-methoxyphenyloxy)-benzene in 20 ml. of concentrated sulfuric acid is stirred at 80° C. for one hour. After this time, the reaction mixture is poured into 200 ml. of ice water and the resultant mixture is heated on a steam bath for 15 minutes. The mixture is cooled and filtered with the precipitate being washed with water and then recrystallized from acetic acid to give 7-methoxyxanthone-2-carboxylic acid.

Likewise prepared is 5-methoxyxanthone-2-carboxylic acid.

PREPARATION 2

The procedures of Preparation 1 are repeated using o-hydroxyphenol and p-hydroxyphenol as starting compounds to respectively prepare 5-hydroxyxanthone-2-carboxylic acid and 7-hydroxyxanthone-2-carboxylic acid.

Alternatively, the hydroxy compounds can be prepared from the lower alkoxy compounds of Preparation 1 according to the following representative procedure.

A mixture of 11 g. of 7-methoxyxanthone-2-carboxylic acid in 100 ml. of concentrated aqueous hydrogen iodide and 100 ml. of acetic acid is refluxed for four hours. After this time, the mixture is cooled, diluted with water, and filtered. The precipittae is washed and dried to give 7 - hydroxyxanthone-2-carboxylic acid. 5-Hydroxyxanthone-2-carboxylic acid is likewise prepared.

PREPARATION 3

A mixture of 15 g. of 2,4-dichlorobenzoic acid, 10 g. of p-methylphenol, 0.5 g. of copper powder and 20 g. of anhydrous potassium carbonate in 200 ml. of dimethylformamide is heated to 165° C. and maintained thereat with stirring and under a nitrogen atmosphere. After monitoring via t.l.c. indicates the reaction is substantially complete, the reaction mixture is diluted with water, treated with charcoal, filtered and the clear filtrate acidified.The precipitate is isolated by suction filtration, washed neutral and dried to give 2-(p-methylphenyloxy)-4-chlorobenzoic acid.

A mixture of 12 g. of 2-(p-methylphenyloxy)-4-chlorobenzoic acid, 72 g. of potassium permanganate, 200 ml. of t-butanol and 350 ml. of water is refluxed for 4.5 hours. After this time, the t-butanol is distilled off, and the reaction mixture is filtered. The filtrate is acidified to give 2-(p-carboxyphenyloxy)-4-chlorobenzoic acid which can be recrystalized from benzene:heptane.

Two g. of 2-(p-carboxyphenyloxy)-4-chlorobenzoic acid in 20 ml. of concentrated sulfuric acid is stirred at 80° C. for one hour. After this time, the reaction mixture is poured into 200 ml. of ice water and the resultant mixture is heated on a steam bath for 15 minutes. The mixture is cooled and filtered with the precipitate being washed with water and then recrystallized from acetic acid to give 6-chloroxanthone-2-carboxylic acid.

6-Chloroxanthone-2-carboxylic acid (2.5 g.) and 1.8 g. of sodium methyl mercaptide in 40 ml. of hexamethylphosphoramide (HMPA) is stirred for two hours at 100° C. After acidification, the product is filtered off, washed with water and dried to give 6-(methylthio)-xanthone-2-carboxylic acid.

The compound 6-methoxyxanthone-2-carboxylic acid is prepared by employing sodium methoxide in the above procedure.

A mixture of 11 g. of 6-methoxyxanthone-2-carboxylic acid in 100 ml. of concentrated aqueous hydrogen iodide and 100 ml. of acetic acid is refluxed for four hours. After this time, the mixture is cooled, diluted with water, and filtered. The precipitate is washed and dried to give 6-hydroxyxanthone-2-carboxylic acid.

PREPARATION 4

A mixture of 4 g. of 6-hydroxyxanthone-2-carboxylic acid, 10 g. of methyl iodide, and 10 g. of lithium carbonate in 50 ml. of dimethylformamide is stirred at room temperature for a period of 16 hours. After this period of time, the reaction mixture is poured into dilute hydrochloric acid-ice and the resultant mixture extracted with ethyl acetate. The extracts are filtered through alumina to give methyl 6-hydroxyxanthone-2-carboxylate which can be recrystallized from methanol.

In like manner, methyl 5-hydroxyxanthone-2-carboxylate and methyl 7-hydroxyxanthone-2-carboxylate are prepared.

PREPARATION 5

To a solution of 6.2 g. of methyl 7-hydoxyxanthone-2-carboxylate in 100 ml. of dimethylformamide are added 1 g. of sodium hydride. The mixture is stirred for 10 minutes at room temperature under nitrogen. Dimethylthiocarbamoyl chloride (3 g.) is then added thereto and the resultant mixture stirred at 70° C. for six hours and then at room temperature for 16 hours. The mixture is then poured into 200 ml. of water containing 1 ml. of acetic acid, the resultant mixture is filtered and the solid dried to give methyl 7-dimethylthiocarbamoyloxyxanthone-2-carboxylate.

Methyl 7 - dimethylthiocarbamoyloxyxanthone-2-carboxylate (8 g.) in 150 ml. of sulfolane is stirred at 230° C. under nitrogen. After a total of six hours under these conditions, t.l.c. indicates the absence of starting material. The mixture is cooled to 80° C. and 150 ml. of hot water are slowly added. The mixture is then cooled and the filtered solid washed with water and dried to give methyl 7-(dimethylcarbamoylthio)xanthone-2-carboxylate.

Methyl 7 - (dimethylcarbamoylthio)-xanthone-2-carboxylate (7.5 g.), 10 g. of potassium hydroxide and 250 ml. of 80% aqueous ethanol is refluxed for one hour. After this time, 250 ml. of water are added and the mixture is treated with charcoal, filtered, acidified. The product is filtered off and dried to give 7-mercaptoxanthone-2-carboxylic acid.

In like manner, 5-mercaptoxanthone-2-carboxylic acid is prepared from methyl 5-hydroxyxanthone-2-carboxylate and 6-mercaptoxanthone-2-carboxylic acid from methyl 6-hydroxyxanthone-2-carboxylate.

The methyl esters of the thus prepared compounds are prepared as described in Preparation 4.

Example 1

A mixture of 2.5 g. of methyl 7-hydroxyxanthone-2-carboxylate and 2.5 ml. of allylbromide (prop-2-en-1-yl bromide) are stirred at room temperature for 16 hours with 2.5 g. of potassium carbonate in 75 ml. of dimethylformamide. After this time, the reaction mixture is acidified and extracted with chloroform to give methyl 7-allyloxyxanthone-2-carboxylate.

In like manner the foregoing procedure can be conducted employing allyl iodide with similar results.

The product compound of the above procedure is hydrolized as described in Preparation 1, paragraph 2 to give 7-allyloxyxanthone-2-carboxylic acid.

Example 2

The procedures of Example 1 are repeated using the reagents listed in Column A below in lieu of allyl bromide to give the respective products listed in Column B below, through their respective methyl esters.

Column A 2-methylallyl bromide
2-ethylallyl bromide
3-methylallyl bromide
3-ethylallyl bromide
2,3-dimethylallyl bromide
2-methyl-3-ethylalkyl bromide
2-ethyl-3-methylallyl bromide
2,3-diethylallyl bromide
3,3-dimethylallyl bromide
3-methyl-3-ethylallyl bromide
3,3-diethylallyl bromide
2,3,3-trimethylallyl bromide
2,3-dimethyl-3-ethylallyl bromide
2-methyl-3,3-diethylallyl bromide
2-ethyl-3,3-dimethylallyl bromide
2,3-diethyl-3-methylallyl bromide
2,3,3-triethylallyl bromide

Column B 7-(2-methylallyloxy)-xanthone-2-carboxylic acid
7-(2-ethylallyloxy)-xanthone-2-carboxylic acid
7-(3-methylallyloxy)-xanthone-2-carboxylic acid
7-(3-ethylallyloxy)-xanthone-2-carboxylic acid
7-(2,3-dimethylallyloxy)-xanthone-2-carboxylic acid
7-(2-methyl-3-ethylallyloxy)-xanthone-2-carboxylic acid
7-(2-ethyl-3-methylallyloxy)-xanthone-2-carboxylic acid
7-(2,3-diethylallyloxy)-xanthone-2-carboxylic acid
7-(3,3-dimethylallyloxy)-xanthone-2-carboxylic acid
7-(3-methyl-3-ethylallyloxy)-xanthone-2-carboxylic acid
7-(3,3-diethylallyloxy)-xanthone-2-carboxylic acid
7-(2,3,3-trimethylallyloxy)-xanthone-2-carboxylic acid
7-(2,3-dimethyl-3-ethylallyloxy)-xanthone-2-carboxylic acid
7-(2-methyl-3,3-diethylallyloxy)-xanthone-2-carboxylic acid
7-(2-ethyl-3,3-dimethylallyloxy)-xanthone-2-carboxylic acid
7-(2,3-diethyl-3-methylallyloxy)-xanthone-2-carboxylic acid;
7-(2,3,3-triethylallyloxy)-xanthone-2-carboxylic acid.

EXAMPLE 3

The procedures of Examples 1 and 2 are repeated using each of methyl 5-hydroxyxanthone - 2 - carboxylate and methyl 6-hydroxyxanthone-2-carboxylate as substrate to produce the corresponding 5- and 6-substituted xanthone-2-carboxylic acid products, through their respective methyl esters, i.e., 5-allyloxyxanthone-2-carboxylic acid;
6-allyloxyxanthone-2-carboxylic acid;
5-(2-methylallyloxy)-xanthone-2-carboxylic acid;
6-(2-methylallyloxy)-xanthone-2-carboxylic acid;
5-(2-ethylallyloxy)-xanthone-2-carboxylic acid;
6-(2-ethylallyloxy)-xanthone-2-carboxylic acid;
5-(3-methylallyloxy)-xanthone-2-carboxylic acid;
6-(3-methylallyloxy)-xanthone-2-carboxylic acid;
5-(3-ethylallyloxy)-xanthone-2-carboxylic acid;
6-(3-ethylallyloxy)-xanthone-2-carboxylic acid;
5-(2,3-dimethylallyloxy)-xanthone-2-carboxylic acid;
6-(2,3-dimethylallyloxy)-xanthone-2-carboxylic acid;
5-(2-methyl-3-ethylallyloxy)-xanthone-2-carboxylic acid;
6-(2-methyl-3-ethylallyloxy)-xanthone-2-carboxylic acid;

5-(2-ethyl-3-methylallyloxy)-xanthone-2-carboxylic acid;
6-(2-ethyl-3-methylallyloxy)-xanthone-2-carboxylic acid;
5-(2,3-diethylallyloxy)-xanthone-2-carboxylic acid;
6-(2,3-diethylallyloxy)-xanthone-2-carboxylic acid;
5-(3,3-dimethylallyloxy)-xanthone-2-carboxylic acid;
6-(3,3-dimethylallyloxy)-xanthone-2-carboxylic acid;
5-(3-methyl-3-ethylallyloxy)-xanthone-2-carboxylic acid;
6-(3-methyl-3-ethylallyloxy)-xanthone-2-carboxylic acid;
5-(3,3-diethylallyloxy)-xanthone-2-carboxylic acid;
6-(3,3-diethylallyloxy)-xanthone-2-carboxylic acid;
5-(2,3,3-trimethylallyloxy)-xanthone-2-carboxylic acid;
6-(2,3,3-trimethylallyloxy)-xanthone-2-carboxylic acid;
5-(2,3-dimethyl-3-ethylallyloxy)-xanthone-2-carboxylic acid;
6-(2,3-dimethyl-3-ethylallyloxy)-xanthone-2-carboxylic acid;
5-(2-methyl-3,3-diethylallyloxy)-xanthone-2-carboxylic acid;
6-(2-methyl-3,3-diethylallyloxy)-xanthone-2-carboxylic acid;
5-(2-ethyl-3,3-dimethylallyloxy)-xanthone-2-carboxylic acid;
6-(2-ethyl-3,3-dimethylallyloxy)-xanthone-2-carboxylic acid;
5-(2,3-diethyl-3-methylallyloxy)-xanthone-2-carboxylic acid;
6-(2,3-diethyl-3-methylallyloxy)-xanthone-2-carboxylic acid;
5-(2,3,3-triethylallyloxy)-xanthone-2-carboxylic acid, and
6-(2,3,3-triethylallyloxy)-xanthone-2-carboxylic acid.

EXAMPLE 4

The procedures of Examples 1, 2, and 3 are repeated using each of methyl 7-mercaptoxanthone-2-carboxylate, methyl 6-mercaptoxanthone-2-carboxylate, and methyl 5-mercaptoxanthone-2-carboxylate as substrates to prepare the corresponding C-7, 6, and 5 substituted xanthone-2-carboxylic acids, through their respective methyl esters, i.e., 7-(allylthio)-xanthone-2-carboxylic acid;
6-(allylthio)-xanthone-2-carboxylic acid;
5-(allylthio)-xanthone-2-carboxylic acid;
7-(2-methylallylthio)-xanthone-2-carboxylic acid;
6-(2-methylallylthio)-xanthone-2-carboxylic acid;
5-(2-methylallylthio)-xanthone-2-carboxylic acid;
7-(2-ethylallylthio)-xanthone-2-carboxylic acid;
6-(2-ethylallylthio)-xanthone-2-carboxylic acid;
5-(2-ethylallylthio)-xanthone-2-carboxylic acid;
7-(3-methylallylthio)-xanthone-2-carboxylic acid;
6-(3-methylallylthio)-xanthone-2-carboxylic acid;
5-(3-methylallylthio)-xanthone-2-carboxylic acid;
7-(3-ethylallylthio)-xanthone-2-carboxylic acid;
6-(3-ethylallylthio)-xanthone-2-carboxylic acid;
5-(3-ethylallylthio)-xanthone-2-carboxylic acid;
7-(2,3-dimethylallylthio)-xanthone-2-carboxylic acid;
6-(2,3-dimethylallylthio)-xanthone-2-carboxylic acid;
5-(2,3-dimethylallylthio)-xanthone-2-carboxylic acid;
7-(2-methyl-3-ethylallylthio)-xanthone-2-carboxylic acid;
6-(2-methyl-3-ethylallylthio)-xanthone-2-carboxylic acid;
5-(2-methyl-3-ethylallylthio)-xanthone-2-carboxylic acid;
7-(2-ethyl-3-methylallylthio)-xanthone-2-carboxylic acid;
6-(2-ethyl-3-methylallylthio)-xanthone-2-carboxylic acid;
5-(2-ethyl-3-methylallylthio)-xanthone-2-carboxylic acid;
7-(2,3-diethylallylthio)-xanthone-2-carboxylic acid;
6-(2,3-diethylallylthio)-xanthone-2-carboxylic acid;
5-(2,3-diethylallylthio)-xanthone-2-carboxylic acid;
7-(3,3-dimethylallylthio)-xanthone-2-carboxylic acid;
6-(3,3-dimethylallylthio)-xanthone-2-carboxylic acid;
5-(3,3-dimethylallylthio)-xanthone-2-carboxylic acid;
7-(3-methyl-3-ethylallylthio)-xanthone-2-carboxylic acid;
6-(3-methyl-3-ethylallylthio)-xanthone-2-carboxylic acid;
5-(3-methyl-3-ethylallylthio)-xanthone-2-carboxylic acid;
7-(3,3-diethylallylthio)-xanthone-2-carboxylic acid;
6-(3,3-diethylallylthio)-xanthone-2-carboxylic acid;
5-(3,3-diethylallylthio)-xanthone-2-carboxylic acid;
7-(2,3,3-trimethylallylthio)-xanthone-2-carboxylic acid;
6-(2,3,3-trimethylallylthio)-xanthone-2-carboxylic acid;
5-(2,3,3-trimethylallylthio)-xanthone-2-carboxylic acid;
7-(2,3-dimethyl-3-ethylallylthio)-xanthone-2-carboxylic acid;
6-(2,3-dimethyl-3-ethylallylthio)-xanthone-2-carboxylic acid;
5-(2,3-dimethyl-3-ethylallylthio)-xanthone-2-carboxylic acid;
7-(2-methyl-3,3-diethylallylthio)-xanthone-2-carboxylic acid;
6-(2-methyl-3,3-diethylallylthio)-xanthone-2-carboxylic acid;
5-(2-methyl-3,3-diethylallylthio)-xanthone-2-carboxylic acid;
7-(2-ethyl-3,3-dimethylallylthio)-xanthone-2-carboxylic acid;
6-(2-ethyl-3,3-dimethylallylthio)-xanthone-2-carboxylic acid;
5-(2-ethyl-3,3-dimethylallylthio)-xanthone-2-carboxylic acid;
7-(2,3-diethyl-3-methylallylthio)-xanthone-2-carboxylic acid;
6-(2,3-diethyl-3-methylallylthio)-xanthone-2-carboxylic acid;
5-(2,3-diethyl-3-methylallylthio)-xanthone-2-carboxylic acid;
7-(2,3,3-triethylallylthio)-xanthone-2-carboxylic acid;
6-(2,3,3-triethylallylthio)-xanthone-2-carboxylic acid; and
5-(2,3,3-triethylallylthio)-xanthone-2-carboxylic acid.

Example 5

A mixture of 1.8 g. of methyl 7-hydroxyvanthone-2-carboxylate, 2 ml. of propargyl bromide (prop-2yn-l-yl bromide) and 2.5 g. of potassium carbonate are stirred for 12 hours at room temperature in 50 ml. of dimethylformamide. After this time, the mixture is acidified, extracted with ethyl acetate and the extract filtered through alumina to give methyl 7 - propargyloxyxanthone-2-carboxylate.

In like manner, the foregoing procedure can be conducted employing propargyl chloride with similar results.

The product compound of the above procedure is hydrolyzed as described in Preparation 1, paragraph 2 to give 7-propargyloxyxanthone-2-carboxylic acid.

Example 6

The procedures of Example 5 are repeated using each of 3-methylpropargyl bromide and 3-ethylpropargyl bromide in lieu of propargyl bromide to give the respective 7-(3-methylpropargyloxy)-xanthone-2-carboxylic acid and 7-(3-ethylpropargyloxy)-xanthone-2-carboxylic acid products, through their respective methyl esters.

Example 7

The procedures of Examples 5 and 6 are repeated using each of methyl 5 - hydroxyxanthone - 2 - carboxylate and methyl 6-hydroxyxanthone-2-carboxylate as substrates to produce the corresponding 5- and 6-substituted xanthone- 2-carboxylic acid products, through their respective methyl esters, i.e., 5-propargyloxyxanthone-2-carboxylic acid,
6-propargyloxyxanthone-2-carboxylic acid,
5-(3-methylproparglyoxy)-xanthone-2-carboxylic acid,
6-(3-methylpropargyloxy)-xanthone-2-carboxylic acid,
5-(3-ethylpropargyloxy)-xanthone-2-carboxylic acid, and
6-(3-ethylpropargyloxy)-xanthone-2-carboxylic acid.

Example 8

The procedures, of Examples 5, 6, and 7 are repeated using each of methyl 7-mercaptoxanthone-2-carboxylate, methyl 5-mercaptoxanthone-2-carboxylate and methyl 6-mercaptoxanthone-2-carboxylate as substrates to prepare the corresponding C-7, 6, and 5 substituted xanthone-2-carboxylic acids, through their respective methyl esters, i.e., 7-(propargylthio)-xanthone-2-carboxylic acid;
6-(propargylthio)-xanthone-2-carboxylic acid;
5-(propargylthio)-xanthone-2-carboxylic acid;
7-(3-methylpropargylthio)-xanthone-2-carboxylic acid;
6-(3-methylpropargylthio)-xanthone-2-carboxylic acid;
5-(3-methylpropargylthio)-xanthone-2-carboxylic acid;
7-(3-ethylpropargylthio)-xanthone-2-carboxylic acid;
6-(3-ethylpropargylthio)-xanthone-2-carboxylic acid, and
5-(3-ethylpropargylthio)-xanthone-2-carboxylic acid.

Example 9

A mixture of 4.5 g. of 7-allyloxy-xanthone-2-carboxylic acid, 10 g. of methyl iodide, and 10 g. of lithium carbonate in 75 ml. of dimethylformamide is stirred at room temperature for a period of 18 hours. After this period of time, the reaction mixture is poured into dilute hydrochloric acid-ice and the resultant precipitate is filtered off and washed to give methyl 7-allyloxyxanthone-2-carboxylate.

The foregoing procedure is repeated using the alternate lower alkyl iodides so as to prepare the corresponding lower alkyl acid esters hereof, e.g.:

ethyl 7-allyloxy-xanthone-2-carboxylate;
n-propyl 7-allyloxy-xanthone-2-carboxylate;
isopropyl 7-allyloxy-xanthone-2-carboxylate;
n-propyl 7-allyloxy-xanthone-2-carboxylate;
isobutyl 7-allyloxy-xanthone-2-carboxylate;
sec-butyl 7-allyloxy-xanthone-2-carboxylate;
n-pentyl 7-allyloxy-xanthone-2-carboxylate, and so forth.

In like manner, the other xanthone-2-carboxylic acids thereof containing substituents at the C-5, 6, or 7 position, prepared as described above, can be converted to the corresponding acid esters, e.g., methyl 7-propargyloxyxanthone-2-carboxylate, ethyl 7-(allylthio)-xanthone-2-carboxylate.

Example 10

To a solution of 10 g. of 7-allyloxyxanthone-2-carboxylic acid in 200 ml. of ethanol is added the theoretical amount of sodium hydroxide dissolved in 200 ml. of 90% ethanol. The reaction mixture is then concentrated in vacuum to give sodium 7-allyloxyxanthone-2-carboxylate.

Sodium 7-propargyloxyxanthone-2-carboxylic acid is also thus prepared.

In a similar manner, the potassium and lithium salts are prepared. Similarly, by replacing the sodium salt by means of an appropriate metal salt reagent, e.g., calcium chloride, manganese chloride, and so forth, the other xanthone-2-carboxylic acid salts are prepared, e.g.:

magnesium 7-allyloxyxanthone-2-carboxylate;
calcium 7-allyloxyxanthone-2-carboxylate;
aluminum 7-allyloxyxanthone-2-carboxylate;
ferrous 7-allyloxyxanthone-2-carboxylate;
zinc 7-allyloxyxanthone-2-carboxylate;
manganese 7-allyloxyxanthone-2-carboxylate;
ferric 7-allyloxyxanthone-2-carboxylate, and so forth.

In a similar manner, the xanthone-2-carboxylic acid salts of the other C-5, 6 or 7 substituted xanthone-2-carboxylic acids hereof are prepared.

Example 11

To a mixture of 50 ml. of concentrated aqueous ammonia in 500 ml. of methanol there are added 20 g. of 7-propargyloxyxanthone-2-carboxylic acid. The resultant mixture is stirred for two hours and is then evaporated to dryness to give the ammonium salt of 7-propargyloxyxanthone-2-carboxylic acid.

A solution of 10 g. of 7-(allylthio)-xanthone-2-carboxylic acid in 50 ml. of thionyl chloride is heated at reflux for one hour. Thereafter, the solution is evaporated to dryness to give the corresponding acid chloride to which is added a concentrated ethereal ammonia solution. The resultant solution is evaporated giving the ammonium salt of 7-(allylthio)-xanthone-2-carboxylic acid.

In like manner, the lower alkyl amides can be prepared using monoalkylamine or dialkylamine in lieu of ammonia in the above procedures. Thus prepared, e.g., are:

7-(3-methylallylthio)-xanthone-2-carboxylic acid amide;
N-methyl 6-(3,3-dimethylallyloxy)-xanthone-2-carboxylic acid amide;
N,N-dimethyl 5-(3-methylpropargyloxy)-xanthone-2-carboxylic acid amide;
N,N-diethyl 7-(3-ethylpropargylthio)-xanthone-2-carboxylic acid amide;
N-ethyl 7-(2-methylallyloxy)-xanthone-2-carboxylic acid amide;
N-n-propyl 5-(allylthio)-xanthone-2-carboxylic acid amide, and so forth.

Example 12

To a mixture of 20 g. of procaine and 500 ml. of aqueous methanol are added 20 g. of 7-(allylthio)-xanthone-2-carboxylic acid. The resultant mixture is stirred at room temperature for 16 hours. It is then evaporated under reduced pressure, to give the procaine salt of 7-(allylthio)-xanthone-2-carboxylic acid.

Similarly, the lysine, caffeine, and arginine salts thereof are obtained. In like manner, the e.g. procaine, lysine, caffeine, and arginine salts of the other 5, 6, or 7-substituted xanthone-2-carboxylic acids are obtained, e.g.:

the procaine salt of 7-(2-methylallylthio)-xanthone-2-carboxylic acid,
the caffeine salt of 6-(2,3-dimethylallyloxy)-xanthone-2-carboxylic acid,
the lysine salt of 5-(3-ethylpropargyloxy)-xanthone-2-carboxylic acid,
the procaine salt of 7-(3-methylpropargylthio)-methyl-xanthone-2-carboxylic acid, and
the arginine salt of 5-(allyloxy)-xanthone-2-carboxylic acid.

Example 13

The following illustrate the method by which the pharmaceutical compositions of the compounds hereof are prepared.

Sodium chloride (0.44 g.) is dissolved in 80 ml. of a (9.47 g./l. water) sodium hydrogen phosphate solution. A sodium dihydrogen phosphate (8.00 g./l. water) solution (20 ml.) is then added thereto. The resultant solution having a pH of 7.38 is sterilized in an autoclave. This vehicle is then added to solid, dry sodium 7-(allyloxy)-xanthone-2-carboxylate to give a preparation suitable for intravenous injection containing 2.5 mg. of sodium 7-(allyloxy)-xanthone-2-carboxylate per ml. of total composition.

7-(Allylthio) - xanthone-2-carboxylic acid is dissolved in a vehicle having a composition ranging from propylene glycol: water of 10:90 (w./w) to propylene glycol: water of 50:50 (w./w.) to give an aerosol preparation suitable for inhalation.

Sodium 7 - propargyloxyxanthone-2-carboxylic acid (1 part) is mixed with from 1 to 10 parts (by weight) of lactose or urea to give a powder preparation suitable for administration by nebulization.

Tablet preparations suitable for oral administration are prepared by mixing the following ingredients in the indicated proportions:

| Component: | Percent, by weight |
| --- | --- |
| A xanthone-2-carboxylic acid compound hereof | 0.5-70 |
| Polyvinylpyrrolidone | 0.5-10 |
| Starch | 10-25 |
| Lactose | 20-75 |
| Magnesium stearate | 0.1-1 |
| Granulating fluids (e.g., aqueous methanol, water, chloroform). | |

Example 14

Illustrative tests procedures for the compounds hereof are as follows:

Normal female (Sprague-Dawley) rats of 140 to 160 grams each are passively sensitized intradermally by injection of rat anti-egg albumin reaginic sera. After 24 hours, each rat is challenged intravenously with 1.75 ml. of 0.4% Evans blue, 1 mg. egg albumin plus 0.25 mg. of 7-allyloxyxanthone-2-carboxylic acid. Control rats receive no xanthone-2-carboxylic acid. The dermal bluing is recorded 15 to 25 minutes later. The rats which receive the 7-allyloxyxanthone-2-carboxylic acid exhibit a 100 per cent inhibition of allergic reaction whereas the control rats exhibit no inhibition.

The above procedure is repeated using 7-propargyloxy-xanthone-2-carboxylic acid, with similar results. The above procedure is repeated using oral administration, with similar results.

Example 15

A dosage of 100 mg. per kg. of body weight of 7-allyl-oxyxanthone-2-carboxylic acid is given intraperitioneally to guinea pigs. Other pigs are left untreated to serve as controls. After treatment, the treated pigs and the controls are exposed to an aqueous spray of 0.05% histamine diphosphate (calc. as base), delivered by a nebulizer, until they exhibit a loss of righting ability. During exposure they are observed for severity of reaction. This ranges from slightly deeper breathing to deep breathing to pre-convulsive gasping and ataxia to collapse. The pigs which receive the 7-allyloxy-xanthone-2-carboxylic acid exhibit a significant resistance to the histamine aerosol challenge, whereas all control pigs collapse within the exposure time.

The above procedure is repeated using 7-propargyloxy-xanthone-2-carboxylic acid with similar results.

The trachea of a recently sacrificed guinea pig is removed by dissection and cut between the segments of cartilege into rings containing trachael muscle which are tied to form a 180° alternating smooth muscle tracheal chain. The thus-produced continuous length of smooth muscle is mounted in a tissue bath maintained at 37° C. with the upper end attached to a linear motion transducer which in turn is connected to a recorder. The responses of a standard, aminophylline, and 7-allyloxyxanthone-2-carboxylic acid are compared after introducing each separately into the bath in various amounts or concentrations. The results show a significant relaxation of the tracheal chain with the test compound.

Inhibition of reaginic antigen-antibody reactions in rats is regarded as representative of inhibition of human reaginic antigen-antibody reactions which occur during allergic episodes. Protection against histamine aerosol induced bronchoconstriction and relaxation of isolated tracheal chain is regarded as representative of human bronchopulmonary activity including bronchodilator activity. Subjects suffering from bronochopulmonary disorders are studied as to severity of bronchospasm and changes in severity by observable and measurable changes in expiratory function. Such measurements include quantitation of expiratory pulmonary air flow, measurable by such instruments as a peak flow meter, and comparison of pulmonary volumes before and after treatment with the subject compounds hereof, as measured by spirometric and/or plethysmographic methods. Subjective relief of the symptoms upon administration of the compounds hereof is evidenced by improvements in dyspnea, wheezing, cough and expectorated sputum.

What is claimed is:

1. A compound selected from those represented by the following formulas:

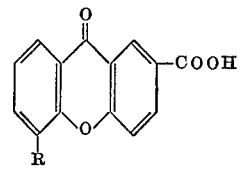

(A)

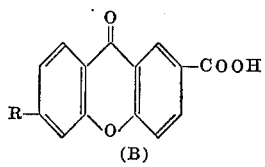 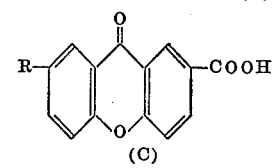

(B) (C)

and the pharmaceutically acceptable, non-toxic esters, amides and salts thereof, wherein each R is a group selected from those of the formulas:

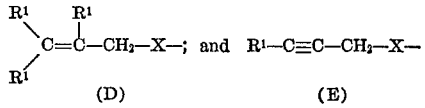

(D) (E)

in which each X is oxy or thio and each $R^1$ is hydrogen, methyl or ethyl.

2. A compound according to Claim 1 of Formula (A).
3. A compound according to Claim 2 wherein R is a group of Formula (D).
4. A compound according to Claim 3 wherein X is oxy and each $R^1$ is hydrogen.
5. A compound according to Claim 2 wherein R is a group of Formula (E).
6. A compound according to Claim 5 wherein X is oxy and $R^1$ is hydrogen.
7. A compound according to Claim 1 of Formula (B).
8. A compound according to Claim 1 of Formula (C).
9. A compound according to Claim 8 wherein R is a group of Formula (D).
10. A compound according to Claim 9 wherein X is oxy and each $R^1$ is hydrogen.
11. A compound according to Claim 8 wherein R is a group of Formula (E).
12. A compound according to Claim 11 wherein X is oxy and $R^1$ is hydrogen.
13. The sodium salt of a compound of Claim 1.
14. The sodium salt according to Claim 13 of Formula (C).

References Cited

UNITED STATES PATENTS 3,706,768   12/1972   Bays _____ 260—335

NORMA S. MILESTONE, Primary Examiner

U.S. Cl. X.R.

424—283